Dec. 30, 1969     R. C. REMINGTON     3,487,303
DEVICE FOR SENSING DEVIATION FROM THE VERTICAL POSITION
Filed Jan. 24, 1967

LEFT TILT

RIGHT TILT

INVENTOR.
RICHARD C. REMINGTON
BY
*Karl A. Ohralik*
ATTORNEY

United States Patent Office 3,487,303
Patented Dec. 30, 1969

3,487,303
DEVICE FOR SENSING DEVIATION FROM THE VERTICAL POSITION
Richard C. Remington, Pompton Plains, N.J., assignor to Singer-General Precision, Inc., Little Falls, N.J., a corporation of Delaware
Filed Jan. 24, 1967, Ser. No. 611,405
Int. Cl. G01r 27/02; G01c 9/00
U.S. Cl. 324—65
4 Claims

ABSTRACT OF THE DISCLOSURE

A spherical enclosure is provided with a pair of substantially diametrically disposed electrodes of equal size and configuration and a third electrode is suspended within one hemisphere of the enclosure. The enclosure is substantially half filled with an electrolyte whereby, in an upright position of the enclosure wherein the one hemisphere is the lower one, the third electrode is immersed and each of the pair of electrodes are partially covered by electrolyte. The electrical circuits between the third electrode and each of the pair of electrodes are made legs of an electrical bridge circuit which is therefore in response to the direction and extent of tilt of the enclosure from a vertical position to provide an electrical output corresponding in phase angle and magnitude, respectively, to the direction and extent of tilt in response to excitation with alternating potential.

BRIEF SUMMARY OF THE INVENTION

This invention relates to an orientation sensing device and more particularly to a device for sensing the direction and extent of deviation of its axis from a vertical position.

In testing, initial installation or operation of many navigation and guidance systems and the like, it is necessary to sense and determine the amount and direction of misalignment of some component from a vertical position. Because such orientation sensing apparatus are also utilized in airborne or space vehicles, it is clearly advantageous that the apparatus itself and associated equipment and circuitry be small, light, and compact without any sacrifice of accuracy and reliability.

Various orientation sensing apparatus have been heretofore proposed, many with considerable operational success. However, these have been restricted in quality or performance in one or more respects. By the very nature of their construction, they are limited to operation over a rather small range of angles, are characterized by high sensitivity and high null shift to temperature, are non-linear in response, have high cross coupling error and exhibit high center of gravity shift when tilted.

In accordance with this invention, each of the aforementioned limiting qualities have been overcome and an orientation sensing element adaptable for airborne and other space vehicle uses and having desirable qualities of size, weight, and power requirement, is provided. The device according to the invention comprises a spherical enclosure with a pair of electrodes being spherical segments symmetrically disposed on opposite sides of the interior of the enclosure and a third electrode preferably suspended within the interior of the enclosure. The enclosure is partially filled with a suitable electrolyte whereby in an upright position, each of the opposed electrodes is partially covered by the electrolyte and the third electrode is immersed therein. The opposed electrodes are of the same surface area exposed to the interior of the enclosure and are of a mirror image geometrical configuration whereby in response to a tilting orientation of the enclosure about a sensing axis, one of the electrodes becomes covered by a greater amount of electrolyte and the other electrode becomes covered by a correspondingly lesser amount of the electrolyte. Thus, the resistance from the third electrode to each of the pair of electrodes may be made to form a leg of an electrical bridge circuit whereby orientation from a vertical position of the enclosure causes the resistance in one of the legs to increase and the other to correspondingly decrease, producing an electrical output from the bridge in response to such tilt. The spherical construction of the enclosure and the opposed electrodes being spherical segments, results in equidistant electrical paths between the immersed electrode and each of the pair of electrodes, imparting overall greater accuracy, reliability and stability to the device.

DETAILED DESCRIPTION

Figure 1:
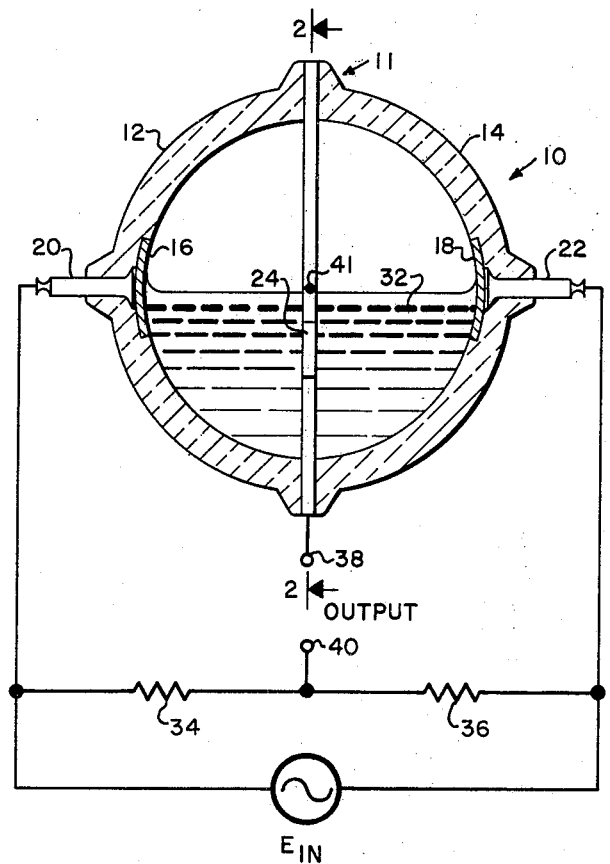
FIGURE 1 is a front sectional view of an orientation sensing device according to this invention together with electrical circuitry, schematically represented, in cooperation with the orientation sensing device to form a complete orientation sensing apparatus.
Figure 2:
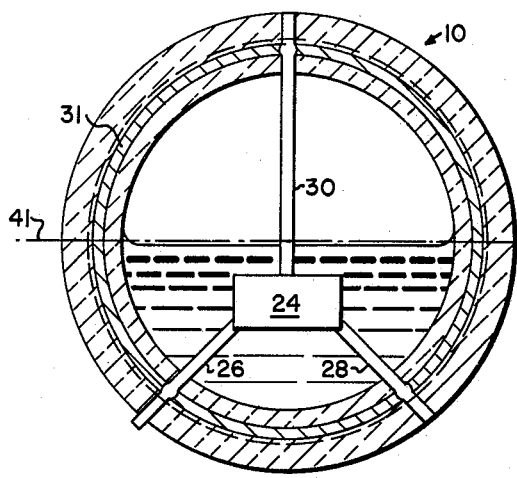
FIGURE 2 is a side sectional view taken along section 2—2 of FIGURE 1.

In FIGURES 1 and 2 of the drawings showing the details of the orientation sensing device of this invention 10 represents generally the sensing device including an enclosure 11 formed of two hemispherical portions 12 and 14 sealed together to form a unitary sphere. Embedded in diametrically opposed interior walls of the hemispherical sections 12 and 14 are electrodes 16 and 18, respectively, which have interior surface portions of the same radius of curvature as the portions 12 and 14 so as to present a smooth, continuous surface between the hemispherical sections and the respective electrodes. For convenience the electrodes are in the form of spherical rectangles, however, they may be of various other configurations, it being necessary only that they have the same interior surface area and be mirror images of each other, the mirror being perpendicular to the paper and in a vertical plane.

In accordance with a preferred embodiment of the invention, sections 12 and 14 may be made of a suitable glass and the electrodes 16 and 18 may be made of platinum which has a coefficient of expansion nearly matching that of the glass from which the sections 12 and 14 are fabricated. Electrically conductive leads 20 and 22 are connected to respective electrodes 16 and 18 and extend through the respective glass sections 12 and 14 exteriorly of the enclosure forming the sensing device 10. A suitable glass to metal bond between these electrodes and the glass maintains the enclosure 11 sealed.

Another electrode 24 is disposed within the enclosure. This electrode may be embedded as are electrodes 16 and 18 but is preferably suspended within the lower hemisphere as seen in FIGURES 1 and 2, and is equidistant from the respective electrodes 16 and 18. To suspend this electrode spatially, three legs 26, 28, and 30, shown more clearly in FIGURE 2, extend from the electrode 24 and are secured to a ring 31 embedded in the glass enclosure to provide stability and support to the electrode 24. These legs and ring are also preferably made of platinum to match the coefficient of expansion of the glass utilized and one of the legs, for example leg 26, extends exteriorly of the enclosure to provide an external electrical lead for the electrode 24.

The interior of the enclosure of device 10 is partially filled, preferably substantially one-half filled, with a suitable electrolyte 32 and in a steady upright position of the device, the level of the liquid covers substantially one-half of each of the electrodes 16 and 18. Also, in this steady upright position, the electrolyte completely immerses the electrode 24. It is to be observed, therefore that the electrical circuit between electrode 24 and each of the electrodes 16 and 18 is substantially equidistant and by reason of the uniformity of the electrolyte 32 and the identical size and the configuration of the electrodes 16 and 18, the electrical resistance of these respective circuits is substantially identical.

In the operation of the device 10, a pair of resistors 34 and 36 are connected in series with each other and the extremities thereof are connected across the terminals 20 and 22. Also a source of alternating electrical potential as represented by $E_{IN}$ is connected across these resistors and therefore across the terminals 20 and 22 also. An output circuit is taken from the terminals 38 and 40 connected to electrode 24 and to the junction between resistors 34 and 36, respectively. The circuit as shown in FIGURE 1 of the drawings and in a steady, upright position of the device 10, forms a balanced bridge circuit wherein the respective legs of the bridge are formed by the resistor 34, resistor 36 and the effective resistance between electrode 24 and respective electrodes 16 and 18. In such a balanced condition, the output potential across the output terminals 38 and 40 is zero.

Figure 3:
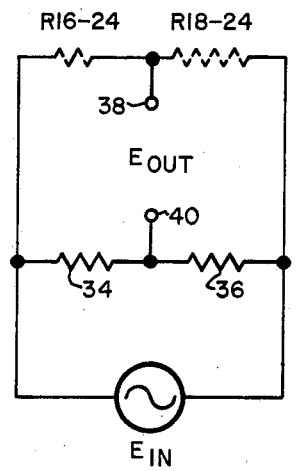
FIGURE 3 is an equivalent electrical circuit schematically representing the condition of the left tilt of the orientation sensing device as shown in FIGURE 1.

In another condition, wherein the device 10 is tilted about a horizontal axis 41 and with the upper portion of the device 10 tilted to the left in FIGURE 1, an unbalanced bridge circuit condition occurs as represented in the equivalent circuit of FIGURE 3 of the drawings. It is to be noted that in such a left tilt position a greater proportion of the electrode 16 is covered by the electrolyte 32 and a corresponding lesser proportion of the electrode 18 is covered by the electrolyte 32. As a consequence, the electrical resistance between the electrodes 16 and 24 becomes decreased and the resistance between electrode 18 and electrode 24 becomes correspondingly increased. This condition is schematically represented in FIGURE 3 by the shorter resistance $R_{16-24}$ and the relatively longer resistance $R_{18-24}$.

In the circuit as represented in FIGURE 3, such an unbalanced condition produces an electrical potential across output terminals 38 and 40 because the variation of resistance between pairs of electrodes is a function of the disparity in electrode coverage by electrolyte 32. By the nature of such a bridge circuit, the phase angle of the output potential is either in-phase or 180 degrees out-of-phase with the input potential, depending upon which pairs of terminals are compared. Thus, for the present purposes, the output potential is regarded as being in-phase with the source potential. For left tilt, therefore, the output potential has a magnitude depending upon the extent of tilt and is in-phase with the input.

Figure 4:
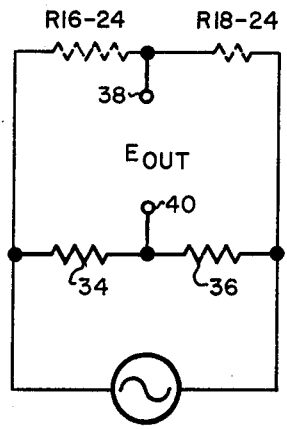
FIGURE 4 is a schematic electrical circuit in the condition of right tilt of the orientation sensing element shown in FIGURE 1.

An alternate condition of right tilt of the device 10 is represented in FIGURE 4 of the drawing wherein the resistance between electrodes 16 and 24 becomes increased and that between electrodes 18 and 24 becomes decreased.

In this circumstance, the extent of tilt is again represented by the magnitude of output potential and the phase of such output is opposite to the phase of the source or input potential, making the same comparisons of terminals as in FIGURE 3.

It should be noted that an orientation sensing device constructed in accordance with this invention possesses several inherent, novel qualities. The device may be made effective to sense relatively large angles of variation from vertical; angles up to 45 degrees being within the sensible range.

The spherical enclosure with electrodes of spherical segments provide constant length electrical paths between electrodes irrespective of orientation of the device 10. As a consequence, the output of the entire apparatus is linear, with output potential varying linearly with extent of variation from vertical position of the device 10. Also, a low cross coupling error exists. The effect of tilt of device 10 about a horizontal axis in the plane of the drawing as well as about its tilt axis 41, is inconsequential because the complementary electrode configuration accommodates such tilt without introducing error.

The level of electrolyte within the device 10 is preferably established at approximately the diameter of the enclosure. At such a level, the variation of level with temperature change is minimized whereby the device and apparatus have a low temperature sensitivity and low null shift with temperature, that is, the initial or zero output position and condition change very little with temperature.

The device 10, of course, is physically stable, particularly because it is constructed of low coefficient of expansion materials. The electrolyte 32 being liquid, always seeks the lowest level within the enclosure of device 10.

What is claimed is:
1. An orientation sensing device, comprising in combination:
   (a) a spherical, electrically insulating enclosure with interior walls;
   (b) a pair of opposed platinum electrodes having the complementary geometrical configuration of spherical segments with concave radii of curvature the same as that of the interior of said enclosure and being embedded in said enclosure to present a smooth, continuous interior surface of the same radius of curvature to the entire interior of said enclosure, said electrodes being rigidly secured to the interior walls of said enclosure with electrical leads extending from each of said electrodes through said enclosure to the exterior thereof;
   (c) a third electrode within the interior of said enclosure suspended from the interior walls of said enclosure likewise having electrical leads extending through said enclosure to the exterior thereof; and,
   (d) a conductive fluid partially filling said enclosure and in one position thereof covering equal portions of said pair of electrodes and at least a portion of said third electrode.

2. An orientation sensing device according to claim 1 wherein said electrodes are of a rectangular spherical configuration.

3. An orientation sensing device according to claim 1 wherein the level of said electrolyte in a vertical position of said axis is in a plane substantially along a diameter of said spherical enclosure.

4. An orientation sensing apparatus comprising the sensing device set forth in claim 1 and additionally comprising a pair of resistors of substantially equal resistance value serially connected across said pair of electrodes forming an effective electrical bridge circuit wherein said resistors and the resistance between said third electrode and each of said pair of electrodes form the respective legs and means for detecting the difference in electrical potential between said third electrode and the junction between said resistors and the relative phase angle thereof whereby the magnitude and phase angle of said potential is analogous to the magintude and direction of tilt of said axis from a vertical position in response to application of an alternating electrical potential across said serially connected resistors.

References Cited

UNITED STATES PATENTS

| 2,414,449 | 1/1947 | Chapin | 33—206.5 |
| 2,456,619 | 12/1948 | Curry et al. | 33—206.5 |

FOREIGN PATENTS

| 1,258,856 | 2/1960 | France. |

EDWARD E. KUBASIEWICZ, Primary Examiner

U.S. Cl. X.R.

33—206.5